United States Patent
Horiguchi (10) Patent No.: US 8,488,131 B2
(45) Date of Patent: Jul. 16, 2013

(54) SCALE, DISPLACEMENT DETECTION APPARATUS PROVIDED WITH THE SAME, AND IMAGING APPARATUS PROVIDED WITH THE SAME

(75) Inventor: Haruhiko Horiguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 170 days.

(21) Appl. No.: 12/698,022

(22) Filed: Feb. 1, 2010

(65) Prior Publication Data

US 2010/0195118 A1    Aug. 5, 2010

(30) Foreign Application Priority Data

Feb. 3, 2009   (JP) ................. 2009-022722

(51) Int. Cl.
*G01B 11/14*    (2006.01)
*G01D 5/34*    (2006.01)

(52) U.S. Cl.
USPC ............... 356/616; 356/614; 250/231.13

(58) Field of Classification Search
USPC ............... 356/610–625; 250/231.13, 239, 250/216, 231.16
See application file for complete search history.

(56) References Cited

U.S. PATENT DOCUMENTS

| | | | | |
|---|---|---|---|---|
| 5,418,136 A * | 5/1995 | Miller et al. | ............ | 435/5 |
| 5,534,693 A * | 7/1996 | Kondo et al. | ............ | 250/237 G |
| 5,666,196 A * | 9/1997 | Ishii et al. | ............ | 356/499 |
| 5,774,219 A * | 6/1998 | Matsuura | ............ | 356/499 |
| 5,909,283 A * | 6/1999 | Eselun | ............ | 356/499 |
| 6,025,596 A * | 2/2000 | Shirai et al. | ............ | 250/339.11 |
| 6,410,911 B1 * | 6/2002 | Omi | ............ | 250/231.13 |
| 6,486,467 B1 * | 11/2002 | Speckbacher et al. | ............ | 250/237 G |
| 6,603,114 B1 * | 8/2003 | Holzapfel et al. | ............ | 250/231.14 |
| 6,621,069 B2 * | 9/2003 | Holzapfel et al. | ............ | 250/231.14 |
| 6,713,756 B2 * | 3/2004 | Yamamoto et al. | ............ | 250/231.13 |
| 6,975,408 B2 * | 12/2005 | Igaki et al. | ............ | 356/616 |
| 7,002,137 B2 * | 2/2006 | Thorburn et al. | ............ | 250/231.13 |
| 7,053,361 B2 * | 5/2006 | Mitamura et al. | ............ | 250/231.13 |
| 7,220,960 B2 * | 5/2007 | Ito | ............ | 250/231.13 |
| 7,830,531 B2 * | 11/2010 | Nakagawa | ............ | 356/614 |
| 8,035,079 B2 * | 10/2011 | Hane | ............ | 250/231.13 |
| 2004/0036017 A1 * | 2/2004 | Ito | ............ | 250/231.13 |
| 2006/0255252 A1 * | 11/2006 | Yamamoto et al. | ............ | 250/231.13 |

FOREIGN PATENT DOCUMENTS

| | | |
|---|---|---|
| JP | 02-019801 A | 1/1990 |
| JP | 07-248207 A | 9/1995 |
| JP | 09-133515 A | 5/1997 |
| JP | 2001-357525 A | 12/2001 |
| JP | 2002-081962 A | 3/2002 |
| JP | 2003-107104 A | 4/2003 |
| JP | 2003-139570 A | 5/2003 |
| JP | 2004-020283 A | 1/2004 |
| JP | 2004-028862 A | 1/2004 |
| JP | 2004-177287 A | 6/2004 |
| JP | 2005-010773 A | 1/2005 |
| JP | 2006-119570 A | 5/2006 |

(Continued)

*Primary Examiner* — Sang Nguyen (74) *Attorney, Agent, or Firm* — Canon U.S.A., Inc. IP Division (57) ABSTRACT

A scale for a displacement detection apparatus includes a base, and reflection layers formed on the base in a lattice structure, wherein the scale is used as a member displaceable relative to a light-emitting element whose emission wavelength is approximately 1000 nm or less and a light-receiving element receiving the light that is emitted from the light-emitting element and is reflected by the reflection layers, and wherein the base is made of silicon.

21 Claims, 8 Drawing Sheets

FOREIGN PATENT DOCUMENTS

| | | |
|---|---|---|
| JP | 2006-133101 A | 5/2006 |
| JP | 2007-019619 A | 1/2007 |
| JP | 2008-170286 A | 7/2008 |
| JP | 04-213403 A | 1/2009 |
| JP | 2009-542178 A | 11/2009 |
| WO | 2008/054879 A | 5/2008 |

* cited by examiner

RELATIONSHIP BETWEEN THICKNESS AND REFLECTANCE OF ANTIREFLECTION LAYER
(ANTIREFLECTION LAYER: SILICON OXIDE, WAVELENGTH: 850nm)

FIG. 7B

RELATIONSHIP BETWEEN THICKNESS AND REFLECTANCE OF ANTIREFLECTION LAYER
(ANTIREFLECTION LAYER: SILICON NITRIDE, WAVELENGTH: 850nm)

FIG. 8

SCALE, DISPLACEMENT DETECTION APPARATUS PROVIDED WITH THE SAME, AND IMAGING APPARATUS PROVIDED WITH THE SAME

BACKGROUND OF THE INVENTION

1. Field of the Invention

The present invention relates to a displacement detection apparatus that detects a displacement of a subject.

2. Description of the Related Art

There has conventionally been known a reflective-type optical encoder as a displacement detection apparatus that detects a displacement of a subject to be measured, such as a moving amount or rotation amount. The reflective-type optical encoder includes a light-emitting element, a scale that reflects light emitted from the light-emitting element and is displaceable relative to the light-emitting element, and a light-receiving element that receives light reflected by the scale.

The scale is provided with a reflective layer that is formed in a lattice structure for reflecting light. Therefore, the quantity of light received by the light-receiving element changes depending on the relative displacement of the scale. The displacement is detected based on a detection signal produced due to the change in the quantity of light at the light-receiving element.

Japanese Patent Application Laid-Open No. 2004-028862 discusses the reflective-type optical encoder described above. This application discusses that a glass or resin is generally used for a base of the scale. The subject of the invention in Japanese Patent Application Laid-Open No. 2004-028862 is such that, when incident light is reflected by the back surface of the base of the scale made of a glass or resin having no reflection layer formed thereon, this reflected light is incident on the light-receiving element as a noise component, which reduces an S/N ratio of the detection signal.

This application discusses the configuration (configuration 1) in which an antireflection film or light-absorbing film is formed on the back surface of the base, and the configuration (configuration 2) in which the back surface of the base is subject to surface-roughening to form a diffuse-reflection surface, for solving the subject.

In the configuration 1, the antireflection film is formed on the back surface of the base, so that the thickness of the scale is increased by the film. When the back surface of the scale is attached to the member whose displacement is detected, the antireflection film and the base might be peeled upon the attachment or after the attachment. In the configuration 2, the surface-roughening process is used, so that productivity is poor and production cost is unsatisfactory.

When a glass is used for the base of the scale as discussed in Japanese Patent Application Laid-Open No. 2004-028862, the thickness cannot be decreased, because the strength is insufficient. Therefore, the thickness of the scale is further increased. When a resin is used, the scale may be deformed due to the irradiated light, other members, or heat from external environment, because resin has a great thermal expansion coefficient. Therefore, the measurement precision is deteriorated.

SUMMARY OF THE INVENTION

According to an aspect of the present invention, a scale for a displacement detection apparatus includes a base, and reflection layers formed on the base in a lattice structure, wherein the scale is used as a member displaceable relative to a light-emitting element whose emission wavelength is approximately 1000 nm or less and a light-receiving element receiving the light emitted from the light-emitting element and reflected by the reflection layers, and the base is made of silicon.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to describe the principles of the invention.

DESCRIPTION OF THE EMBODIMENTS

Various exemplary embodiments, features, and aspects of the invention will be described in detail below with reference to the drawings.

The scale for a displacement detection apparatus according to the present invention includes a base, and a reflection layer formed on the base in a lattice structure. The lattice structure of the scale is formed such that the reflection layers and the portion (non-reflection portion) between the adjacent reflection layers are alternately formed. The scale moves in the lattice direction relative to the light-emitting element and the light-receiving element of the displacement detection apparatus. The scale may actually move, or the light-emitting element or the light-receiving element may actually move.

The base of the scale according to the present invention is made of silicon. The silicon means monocrystalline silicon, polycrystalline silicon, and metallic silicon, and does not include amorphous silicon. Further, the silicon may contain impurities, such as boron or phosphor, or other impurities mixed during the production process in an amount of small percent.

Since the silicon allows light having a wavelength of more than 1000 nm to pass, the light incident on the scale reaches the back surface of the scale, i.e., the surface reverse to the surface having the reflection layers formed thereon, and is reflected thereon. However, light having the wavelength of not more than 1000 nm hardly passes through the silicon.

Therefore, the light incident on the scale is absorbed by the inside of the silicon base, so that it hardly reaches the back surface of the scale.

Even if the light reaches the back surface of the scale, it is absorbed by the silicon base until it returns to the surface of the scale. Therefore, light hardly emits from the non-reflection portion to the outside of the scale. Accordingly, the scale of the present invention can reduce the noise of the light incident on the light-receiving element, and enhance the S/N ratio of the detection signal.

Since the silicon has a higher strength than a glass, the thickness of the base can be more decreased. Further, since the silicon has a smaller thermal expansion coefficient than a resin, the silicon base hardly deforms. Therefore, the detection precision is hardly deteriorated.

When the scale is mounted to the member whose displacement is to be detected, the back surface can be mounted to the member to be detected to decrease the thickness of the scale portion. In this case, the configuration in which the antireflection film is formed on the back surface as in the conventional case causes the reflection at the interface at the antireflection film at the side of the target member. Further, the antireflection film and the base might be peeled upon the attachment or after the attachment.

However, in the scale according to the present invention, there is little reflection on the back surface of the base. Moreover, the base can directly be mounted. Therefore, the issue of the peeling film can be avoided.

A first exemplary embodiment of the present invention will be described with reference to FIGS. 1 to 5.

Figure 1:
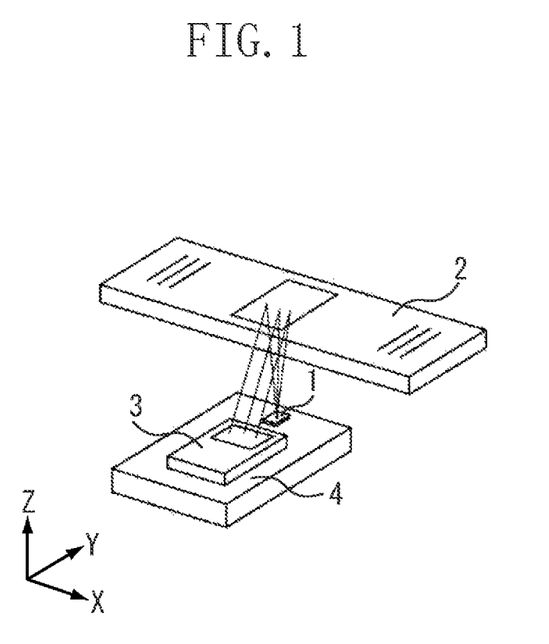
FIG. 1 is a schematic view illustrating a configuration of a displacement detection apparatus using a scale according to an exemplary embodiment of the present invention.

In FIG. 1, a relative moving direction of a scale 2 is defined as an X direction, the direction perpendicular to the X direction in the plane of the scale is defined as a Y direction, and the direction perpendicular to the plane of the scale 2 is defined as a Z direction. The same is true for the coordinate axis in each figure described below.

A light-emitting element 1 emits light, having a wavelength of 1000 nm or less and absorbed by a base 21 of the scale, toward the scale 2. A light-emitting diode (LED) is used for the light-emitting element 1. The light emitted from the light-emitting element 1 is reflected by the scale 2 that is displaced relative to the light-emitting element 1, and then, enters a light-receiving element 3. The light-receiving element 3 converts the incident light into an electric signal. A photodiode array is used for the light-receiving element 3.

In the present exemplary embodiment, the light-emitting element 1 and the light-receiving element 3 are integrally formed on one substrate with a semiconductor element that is made of an IC chip having incorporated therein a signal processing section for processing the signal generated by the light-receiving element 3, thereby forming a detection head.

Figure 2:
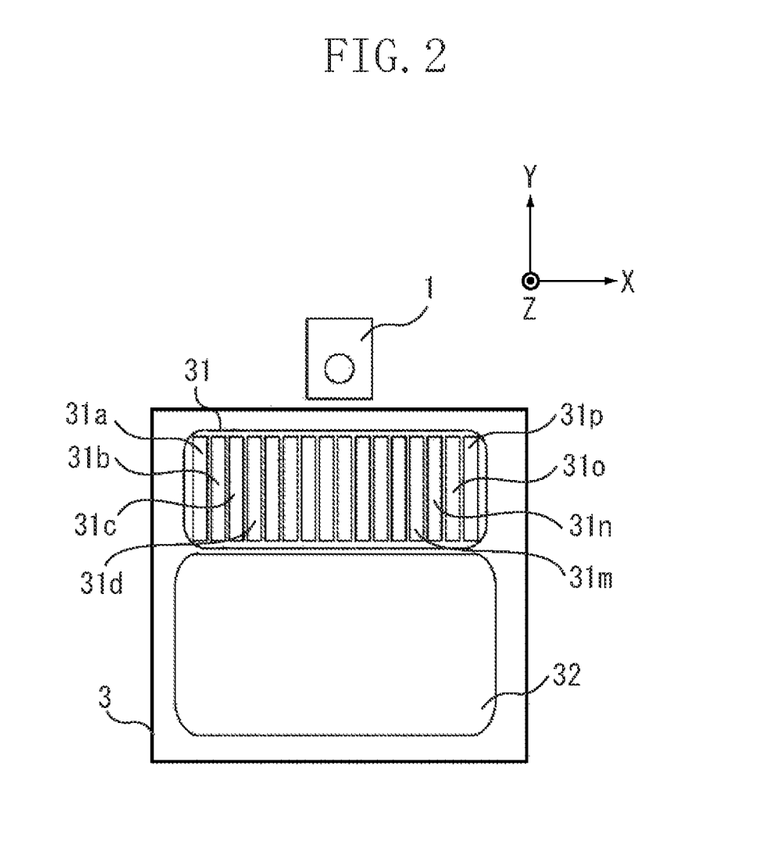
FIG. 2 is a schematic plan view of a detection head that constitutes the displacement detection apparatus according to an exemplary embodiment of the present invention.

FIG. 2 is a schematic plan view of the detection head. As illustrated in FIG. 2, the light-receiving element 3 is arranged in the vicinity of the light-emitting element 1. The light-receiving element 3 has a light-receiving area 31, which is arranged near the light-emitting element 1, and a signal processing section 32.

The light-receiving area 31 has 16 photodiodes 31a, 31b, 31c, 31d, . . . , 31m, 31n, 31o, and 31p in the horizontal direction. These photodiodes are equally spaced. The photodiodes 31a, 31e, 31i, and 31m are electrically connected, and a set of these photodiodes is defined as an a-phase. A set of the photodiodes 31b, 31f, 31j, and 31n is defined as a b-phase. Similarly, a c-phase and a d-phase are defined.

Each of the photodiode groups of a-phase, b-phase, c-phase, and d-phase outputs optical current according to the quantity of light when receiving light. Since the quantity of light incident on the photodiode groups of the a-phase to the d-phase changes with the displacement of the scale 2 in the X direction, the output current changes with the displacement of the scale 2. The photodiode groups of the a-phase to the d-phase output current that varies having the phase relationship in which the b-phase is at 90 degrees, the c-phase is at 180 degrees, and the d-phase is at 270 degrees with respect to the a-phase defined as a reference.

The signal processing section 32 converts the output current into a voltage value at a current-voltage converter, and then, a differential amplifier obtains the differential component between the a-phase and the c-phase, and the differential component between the b-phase and the d-phase to output displacement signals of A- and B-phases that are shifted at 90 degrees with each other.

The obtained displacement signals of the A-phase and the B-phase are output to a position calculating section (not illustrated). The position calculating section counts the peak of the signal from the displacement signal of the A-phase or the B-phase, thereby obtaining the passing number of interference patterns formed on the light-receiving area 31 by the reflected and diffracted light from the scale 2.

When the pitch of the interference pattern is multiplied by the counted number, the displacement of the scale 2 is roughly calculated, so that displacement information of the subject to be measured is detected. The more precise displacement can be calculated by calculating the arctangent of both signals between the peaks of the signals of the A-phase and the B-phase.

The scale for the displacement detection apparatus according to the present exemplary embodiment will be described.

Figure 3:
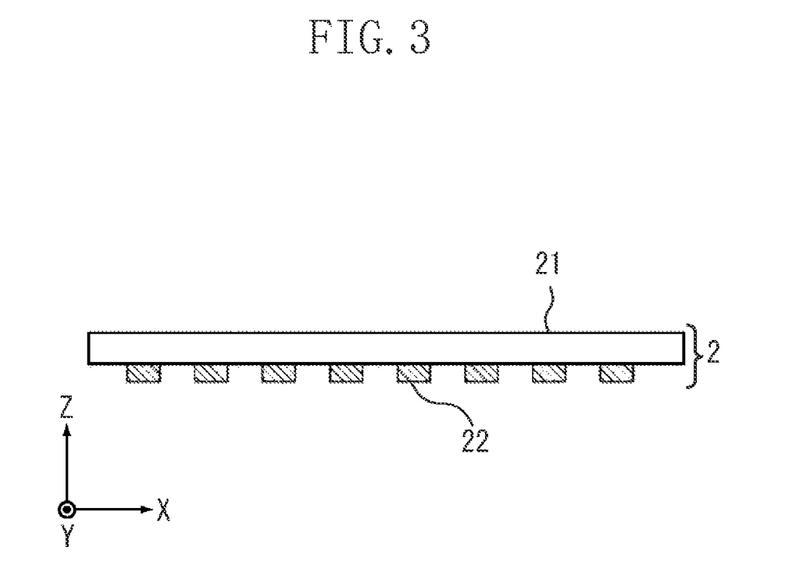
FIG. 3 is a schematic sectional view of the scale according to a first exemplary embodiment of the present invention.
Figure 4:
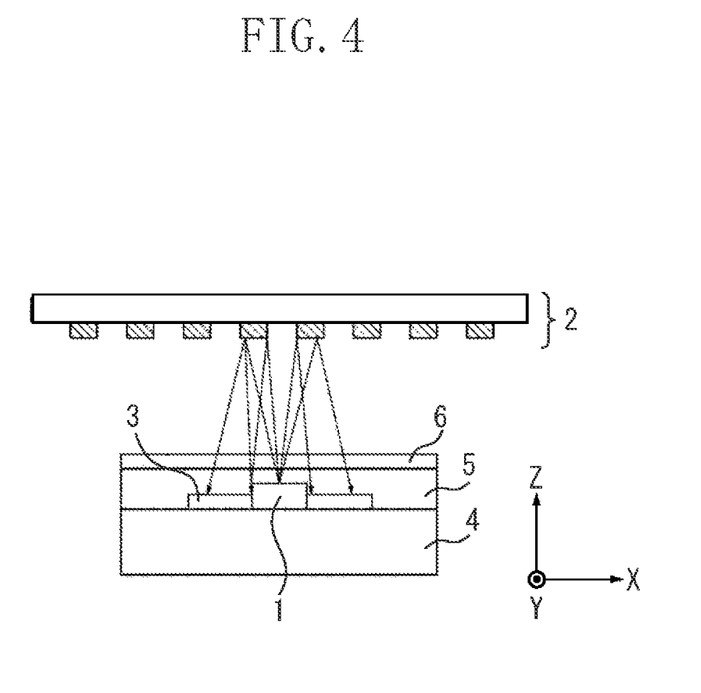
FIG. 4 is a schematic sectional view of the displacement detection apparatus using the scale according to the first exemplary embodiment of the present invention.

FIG. 3 is a schematic sectional view illustrating the scale according to the present exemplary embodiment, and FIG. 4 is a schematic sectional view of the displacement detection apparatus using the scale according to the present exemplary embodiment.

The scale 2 has a base 21 and reflection layers 22, which is formed in a lattice structure on the base 21. The base 21 is made of silicon. On the other hand, the light-emitting element 1 and the light-receiving element 3 formed on a substrate 4 are covered with a resin 5, and a glass plate 6 is arranged above the resin 5.

The light emitted from the light-emitting element 1 and entering the reflection layers 22 is reflected, but the light entering the exposed base 21 between the reflection layers 22 is mostly absorbed by the inside of the base 21. Therefore, the light received by the light-receiving element 3 has good contrast when the scale 2 is moved, whereby a detection signal having less noise can be obtained.

Next, a light absorbing characteristic and light transmittance of silicon will be described with reference to FIG. 5.

When the intensity of the incident light is defined as $I_0$, and the advancing distance in a medium is defined as x, the light intensity I is represented as follows with the use of an absorption coefficient $\alpha$.

$$I = I_0 \times \exp(-\alpha x) \quad (1)$$

Figure 5A:
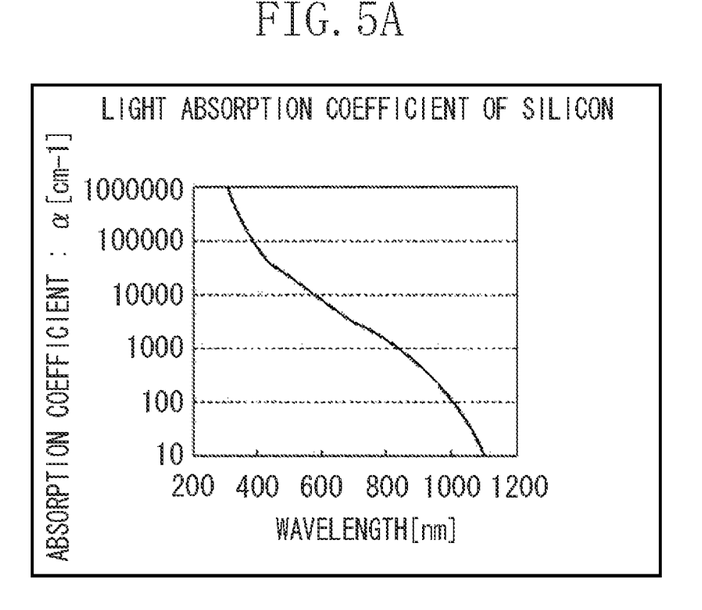
FIGS. 5A and 5B illustrate light absorbing characteristic and light transmittance characteristic of silicon.

FIG. 5A illustrates the relationship between the absorption coefficient $\alpha$ and the wavelength $\lambda$ of the silicon (monocrystalline silicon). It is known that the silicon absorbs light having a wavelength of 1000 nm or less including visible light. When the wavelength of the emitted light from the light-emitting element 1 is 1000 nm or less, the silicon has a characteristic of absorbing the light.

For example, when the advancing distance x is defined as 1 mm, which is a thickness of an ordinary scale for a reflective-type optical encoder, and the wavelength $\lambda$ of the light emitted from the light-emitting element 1 is defined as 850 nm, the absorption coefficient α is about 600 to 700 [cm$^{-1}$]. Therefore, $I/I_0$ becomes approximately $10^{-26}$ from the equation (1), which means that the light reaching the back surface of the scale is extremely small.

Figure 5B:
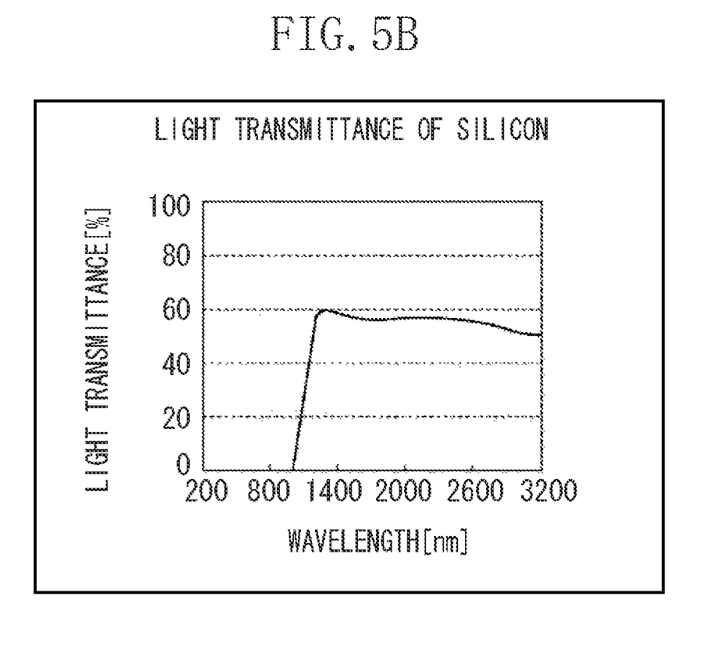

FIG. 5B illustrates the relationship between the light transmittance of the silicon and the wavelength of the incident light. As illustrated in FIG. 5A, the silicon absorbs light when the light has a wavelength of 1000 nm or less. Therefore, when the silicon is used for the base of the scale, light hardly reaches the back surface of the scale. Accordingly, even when a member for holding the scale and the back surface of the scale are bonded via an adhesive, stray light from the adhesive is extremely small.

A monocrystalline silicon, which is used for a semiconductor element of an integrated device, is used as the silicon. A polycrystalline silicon used for a solar cell or metallic silicon that is used as a raw material of the monocrystalline silicon can be used, since they have light absorbing characteristic and light transmittance characteristic equal to those of the monocrystalline silicon.

Further, a polished wafer manufactured using the monocrystalline silicon, and an anneal wafer and epitaxial wafer that are extended products of the polished wafer, can be used, since they have light absorbing characteristic and light transmittance characteristic equal to those of the monocrystalline silicon.

The thickness of the base 21 used is thin to decrease the thickness of the scale. The thickness of the base 21 is approximately 0.3 mm or more to secure the strength of the scale and surely perform the light absorption. The glass that is conventionally used for the base of the scale has to have a thickness of 1.0 mm or more to give strength equal to that of the silicon. More specifically, the thickness of the base is set to 0.3 mm or more and 1.0 mm or less from the viewpoint of decreasing the thickness and light absorption.

Since the silicon that can be used for the base of the scale according to the present invention is excellent in workability and has a good mechanical strength, it may be suitable for a small and thin scale. Accordingly, it may be suitable for the manufacture of an ultracompact optical encoder mounted on a digital camera or digital video camera.

In the present invention, it is unnecessary to form a thin film such as an antireflection film or light absorption film on the back surface of the scale as in the conventional scale for a reflective-type optical encoder, and there is no possibility of peeling of a film upon bonding the scale to the holding member. As a result, there is no possibility of the occurrence of stray light from the adhesive.

On the other hand, a material having a high reflectance for the wavelength of light emitted from the light-emitting element is used for the reflection layer 22. More specifically, aluminum or aluminum alloy can be used. Examples of the aluminum alloy include Al—Si alloy, which is a material for an architectural panel, or Al—Cu alloy, which is a material of pure aluminum or duralumin.

The reason why the Al—Si alloy is used is that it has excellent affinity with the silicon, which is a base, and has excellent abrasion resistance. The reason why the Al—Cu alloy is used is that it can retain a surface flatness even when it is put under high temperature during the forming process.

The lattice pitch of the reflection layers is a half the pitch (the distance from the left end of the photodiode 31a to the left end of the photodiode 31e) of the photodiode, when the photodiode groups of the a-phase to the d-phase are defined as one cycle.

The thickness of the reflection layer 22 is set to satisfy the equation of:

$$2d=m\lambda \text{ (m is an integer)} \quad (2)$$

wherein the wavelength of light emitted from the light-emitting element 1 is defined as λ, and the thickness of the reflection layer 22 is defined as d.

The scale according to the present invention can be manufactured by the process described below. A commercially available silicon wafer (polished wafer) is prepared, and it is washed. After the wafer is washed, a material (e.g., aluminum) for the reflection layer is formed on the wafer by a sputtering method or the like. Thereafter, the reflection layers in a lattice structure are formed by a photolithographic method in which processes of resist application, exposure, development, etching, and resist separation are sequentially performed.

A second exemplary embodiment of the present invention will be described with reference to FIGS. 6 and 7, and Table 1. A scale for the displacement detection apparatus according to the present exemplary embodiment is provided with an antireflection layer between the reflection layers of the scale in the first exemplary embodiment to prevent the reflection on the exposed surface of the base.

Figure 6:
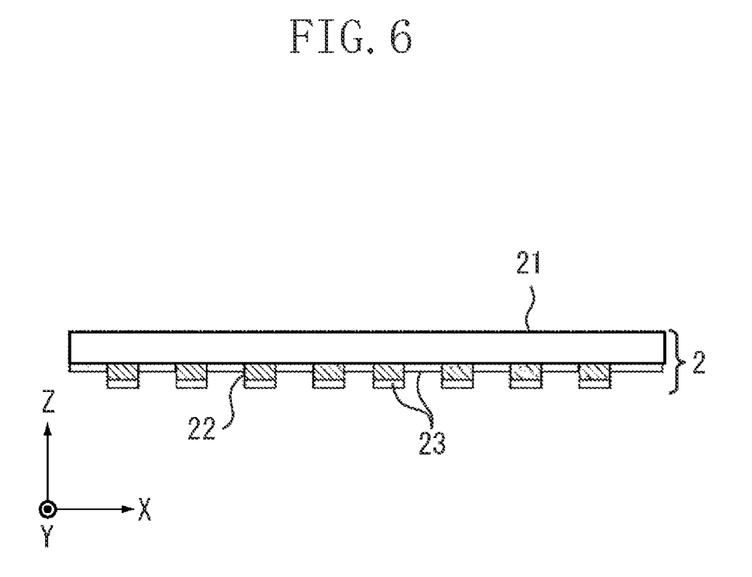
FIG. 6 is a schematic sectional view of a scale according to a second exemplary embodiment of the present invention.

FIG. 6 is a schematic sectional view of the scale according to the second exemplary embodiment, wherein the same numerals are given to the components similar to those in the first exemplary embodiment.

An antireflection layer 23 is formed at least on the base 21 exposed between the reflection portions 22 for preventing light reflected on the exposed surface of the base. A material for the antireflection layer 23 is silicon oxide ($SiO_2$) or silicon nitride (SiN) that has excellent affinity with the silicon, which is the best material for the base, and can stably be formed into a film. However, the material is not limited thereto. For example, a resin such as acryl, polyimide, and silicon, and silicon oxynitride (SiON) can be used.

The thickness of the antireflection layer 23 is set to satisfy the equation of $$4nd=(2m-1)\lambda \text{ (m is a natural number)} \quad (3)$$

wherein the wavelength of light emitted from the light-emitting element 1 is defined as λ, the thickness of the antireflection layer 23 is defined as d, and the refractive index of the antireflection layer 23 is defined as n.

When the thickness of the antireflection layer 23 is set to satisfy the equation (3), the light reflected on the surface of the antireflection layer 23 and the light reflected on the back surface can be canceled with each other due to the interference. However, when the thickness is large (e.g., 1 μm or more), irregularity may be produced in the thickness, production cost may be increased, and productivity may be deteriorated. Therefore, m can be set to 1.

The antireflection layer 23 is formed also on the reflection layers 22 in FIG. 6, so that the reflection on the reflection layers 22 is prevented. However, since the reflection on the surface of the base is prevented, the S/N ratio is enhanced.

The effect of the antireflection layer 23 will be described with reference to the specific example of the configuration. When the antireflection layer 23 is not formed, the reflectance on the surface of the base is obtained as follows. Specifically, when the refractive index of the base is defined as $n_0$, and the refractive index of the medium that is in contact with the interface of the base is defined as $n_1$, the reflectance R when the light vertically enters the surface is represented by the equation described below:

$$R=\{(n_0-n_1)/(n_0+n_1)\}^2 \quad (4)$$

Since the refractive index of the silicon for every wavelength is as indicated in Table 1, the reflectance R of the light reflected on the surface of the base (silicon) is calculated as about 33%, when the wavelength of a light source is 850 nm.

Figure 7A:
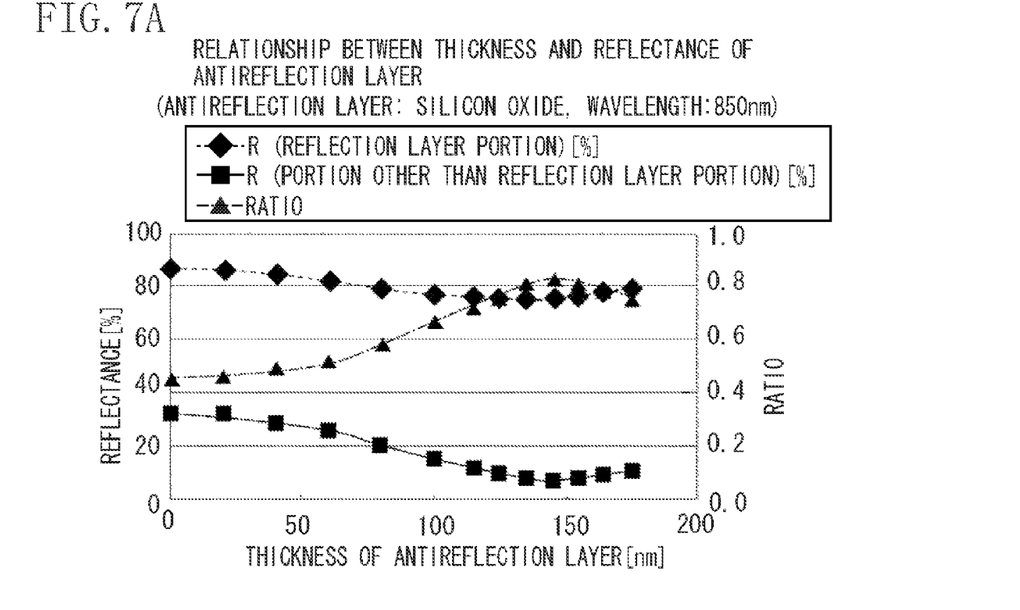
FIGS. 7A and 7B illustrate a simulation result of reflectance on the surface of the scale when an antireflection layer is formed on the surface of the base.
Figure 7B:
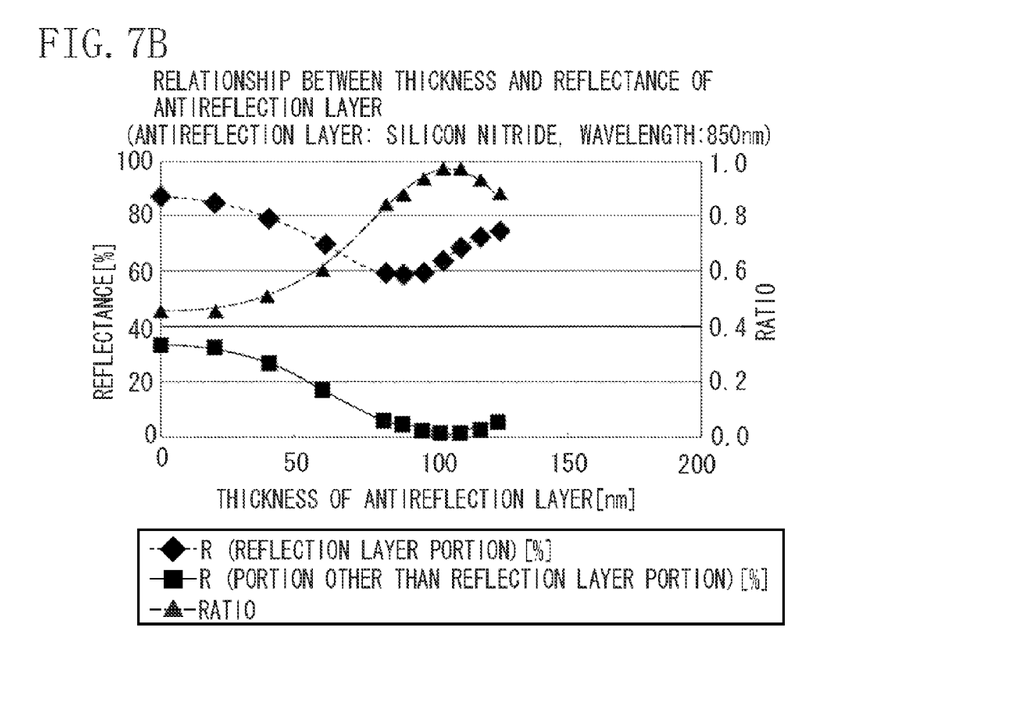

On the other hand, FIG. 7 illustrates the simulation result of the reflectance on the surface of the scale, when the antireflection layer 23 is formed on the surface of the base 21. FIG. 7A illustrates the result when the antireflection layer 23 made of silicon oxide ($SiO_2$) is formed, while FIG. 7B illustrates the result when the antireflection layer 23 made of silicon nitride (SiN) is formed.

In FIGS. 7A and 7B, the wavelength of the light source is set to be 850 nm, the abscissa axis indicates the thickness of the antireflection layer, and the ordinate axis indicates the reflectance. The dotted line in the figures indicates the reflectance (referred to as A) when the light is irradiated to the reflection layer portion, while the solid line indicates the reflectance (referred to as B) when the light is irradiated to the portion other than the reflection layer portion. The dashed-dotted line indicates its ratio $(=(A-B)/(A+B))$.

In FIGS. 7A and 7B, it is understood that the reflectance indicated by the solid line decreases more in the case in which the antireflection layer is formed than in the case in which the thickness of the antireflection layer is 0 nm, i.e., the antireflection layer is not formed. In FIG. 7A, when the thickness of the antireflection layer satisfies the equation (3), specifically, when the thickness of the antireflection layer is 146 nm, the reflectance indicated by the solid line becomes the minimum, and the ratio indicated by the dashed-dotted line becomes the maximum. Similarly, in FIG. 7B, when the thickness of the antireflection layer satisfies the equation (3), specifically, when the thickness of the antireflection layer is 104 nm, the reflectance indicated by the solid line becomes the minimum, and the ratio indicated by the dashed-dotted line becomes the maximum.

When the thickness of the antireflection layer is set such that the value indicated by the dashed-dotted line becomes the local maximum or maximum, the S/N ratio of the detection signal significantly can be improved.

TABLE 1

| Wavelength (nm) | Refractive index |
|---|---|
| 390 | 6.27 |
| 401 | 5.90 |
| 413 | 5.65 |
| 428 | 5.40 |
| 441 | 5.15 |
| 456 | 4.91 |
| 471 | 4.72 |
| 488 | 4.58 |
| 506 | 4.40 |
| 525 | 4.32 |
| 547 | 4.24 |
| 569 | 4.15 |
| 593 | 4.07 |
| 620 | 4.02 |
| 649 | 3.97 |
| 681 | 3.92 |
| 717 | 3.86 |
| 756 | 3.81 |
| 800 | 3.77 |
| 850 | 3.73 |

Figure 8:
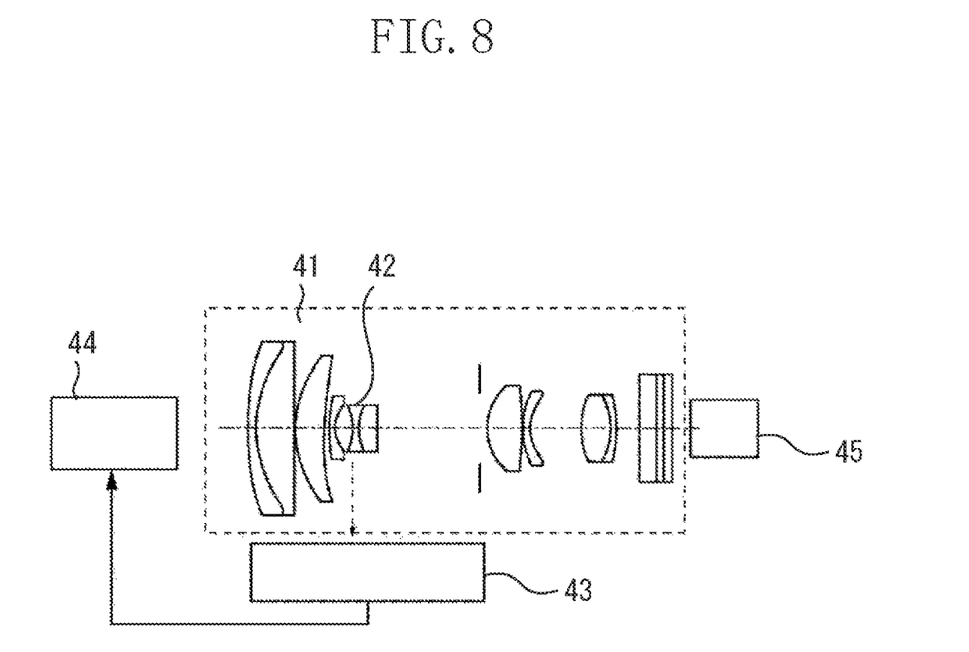
FIG. 8 is a schematic sectional view of an imaging apparatus according to a third exemplary embodiment of the present invention.

The example in which the displacement detection apparatus according to the present invention is mounted to a lens barrel will be described with reference to FIG. 8. FIG. 8 is a schematic sectional view of an imaging apparatus having the displacement detection apparatus according to the present invention. The imaging apparatus has a lens group 41, a movable lens 42, a detection head 43 including a light-emitting element and a light-receiving element, a CPU 44, and an imaging device 45, wherein the lens group 41, the movable lens 42, the CPU 44, and the imaging device 45 form an imaging unit.

The movable lens 42 included in the lens group 41 is, for example, an autofocus lens, which is displaceable in the optical axis direction. The movable lens 42 may be other lens that can be driven, such as a zoom adjusting lens.

The scale of the displacement detection apparatus according to the present invention is held by an actuator that drives the movable lens 42 (not illustrated), and it is displaceable relative to the detection head 43. The signal obtained from the detection head 43 according to the displacement of the movable lens 42 is output to the CPU 44. The CPU 44 produces a drive signal for moving the movable lens 42 to a desired position. The movable lens 42 is driven based on this signal.

When light from the light-emitting element is incident on the imaging device 45, the light emitted from the light-emitting element is unfavorably detected by the imaging device, which causes the captured image to include noise. Therefore, a near-infrared light source having a wavelength that is not detected by the imaging device, i.e., having a wavelength of 800 nm or more and 1000 nm or less is used.

The displacement detection apparatus having the scale according to the present invention is applicable to various apparatuses other than the imaging apparatus. For example, it is applicable to an apparatus for detecting displacement, such as a scanning optical system or conveyance system in an image forming apparatus using an electrophotographic technique, a sheet conveying system in an ink jet printer, a stage of an exposure apparatus, and a robot arm.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-022722 filed Feb. 3, 2009, which is hereby incorporated by reference herein in its entirety.

What is claimed is:

1. A scale for a displacement detection apparatus comprising:
   a base; and
   a reflection pattern formed on the base;
   wherein the scale is used as a member displaceable relative to a light-emitting element whose emission wavelength is 1000 nm or less and a light-receiving element receiving the light that is emitted from the light-emitting element and is reflected by the reflection pattern,
   wherein the base is made of one of monocrystalline silicon, polycrystalline silicon, and metallic silicon, and
   wherein a thickness of the base is from 0.3 mm to 1.0 mm inclusive.

2. The scale according to claim 1, wherein an antireflection pattern is formed on at least an area where the reflection pattern is not formed on the base.

3. The scale according to claim 2, wherein the antireflection pattern is made of silicon oxide or silicon nitride.

4. The scale according to claim 1, wherein the silicon of the base has a characteristic of absorbing light of a wavelength of 850 nm.

5. The scale according to claim 1, wherein the silicon of the base has a characteristic of absorbing light emitted from the light-emitting element.

6. The scale according to claim 1,
wherein the reflection pattern is formed on the base in a lattice structure, and
wherein the lattice structure is periodic in a relative moving direction of the scale and the light-emitting element.

7. The scale according to claim 1, wherein a thickness of the reflection pattern is set to satisfy an equation of:

$$2d=m\lambda \text{ (m is an integer)},$$

wherein the thickness of the reflection pattern is defined as d and the emission wavelength is defined as $\lambda$.

8. A displacement detection apparatus comprising:
a light-emitting element whose emission wavelength is 1000 nm or less;
a scale that is displaceable relative to the light-emitting element, and includes a base, and a reflection pattern formed on the base; and
a light-receiving element configured to receive light that is emitted from the light-emitting element and is reflected on the reflection pattern,
wherein the base is made of one of monocrystalline silicon, polycrystalline silicon, and metallic silicon, and
wherein a thickness of the base is from 0.3 mm to 1.0 mm inclusive.

9. The displacement detection apparatus according to claim 8, wherein the silicon of the base has a characteristic of absorbing light of a wavelength of 850 nm.

10. The displacement detection apparatus according to claim 8, wherein the silicon of the base has a characteristic of absorbing light emitted from the light-emitting element.

11. The displacement detection apparatus according to claim 8, wherein information on the scale and the light-emitting element or relative positions of the scale and the light-emitting element is output based on a result of receiving light by the light-receiving element.

12. The displacement detection apparatus according to claim 8, wherein an emission wavelength of the light-emitting element is between 800 nm and 1000 nm.

13. The displacement detection apparatus according to claim 8,
wherein the reflection pattern is formed on the base in a lattice structure, and
wherein the lattice structure is periodic in a relative moving direction of the scale and the light-emitting element.

14. An apparatus comprising:
an imaging unit having a lens displaceable in an optical axis direction; and
a displacement detection apparatus configured to detect the displacement of the lens,
wherein the displacement detection apparatus includes:
a light-emitting element whose emission wavelength is 1000 nm or less;
a scale that is displaceable relative to the light-emitting element and the light-receiving element, and includes a base, and a reflection pattern formed on the base; and
a light-receiving element configured to receive light that is emitted from the light-emitting element and is reflected on the reflection pattern,
wherein the base is made of one of monocrystalline silicon, polycrystalline silicon, and metallic silicon, and
wherein a thickness of the base is from 0.3 mm to 1.0 mm inclusive.

15. The apparatus according to claim 14, wherein an emission wavelength of the light-emitting element is between 800 nm and 1000 nm.

16. The apparatus according to claim 14, wherein the silicon of the base has a characteristic of absorbing light of a wavelength of 850 nm.

17. The apparatus according to claim 14, wherein the silicon of the base has a characteristic of absorbing light emitted from the light-emitting element.

18. The apparatus according to claim 14, wherein information on the scale and the light-emitting element or relative positions of the scale and the light-emitting element is output based on a result of receiving light by the light-receiving element.

19. The apparatus according to claim 14,
wherein the reflection pattern is formed on the base in a lattice structure, and
wherein the lattice structure is periodic in a relative moving direction of the scale and the light-emitting element.

20. A lens apparatus used for an imaging apparatus including an imaging element configured to not detect light of a wavelength from 800 nm to 1000 nm inclusive, the lens apparatus comprising:
a lens to be driven in direction of an optical axis;
a light-emitting element whose emission wavelength is 800 nm to 1000 nm inclusive;
a light-receiving element configured to receive light emitted from the light- emitting element and reflected on a reflection pattern; and
a scale including a base and a reflection pattern in a lattice structure formed on the base and being displaceable relative to the light-emitting element and the light-receiving element,
wherein the light-emitting element, the light-receiving element and the scale are used to detect a position of the lens relative to the lens apparatus, and
wherein the base is made of one of monocrystalline silicon, polycrystalline silicon, and metallic silicon, and wherein a thickness of the base is from 0.3 mm to 1.0 mm inclusive.

21. An imaging apparatus comprising:
an imaging element configured to not detect light of a wavelength from 800 nm to 1000 nm inclusive; and
a lens apparatus configured to guide a light beam from a subject to the imaging element,
wherein the lens apparatus comprises:
a lens to be driven in direction of an optical axis;
a light-emitting element whose emission wavelength is 800 nm to 1000 nm inclusive;
a light-receiving element configured to receive light emitted from the light-emitting element and reflected on a reflection pattern; and
a scale including a base and a reflection pattern in a lattice structure formed on the base and being displaceable relative to the light-emitting element and the light-receiving element,
wherein the light-emitting element, the light-receiving element and the scale are used to detect a position of the lens relative to the lens apparatus, and
wherein the base is made of one of monocrystalline silicon, polycrystalline silicon, and metallic silicon, and wherein a thickness of the base is from 0.3 mm to 1.0 mm inclusive.

* * * * *